US008385683B2

(12) United States Patent
Lin (10) Patent No.: US 8,385,683 B2
(45) Date of Patent: Feb. 26, 2013

(54) SELF-POSITIONING DEVICE AND METHOD THEREOF

(75) Inventor: Tzung-Han Lin, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 453 days.

(21) Appl. No.: 12/650,553

(22) Filed: Dec. 31, 2009

(65) Prior Publication Data

US 2011/0097014 A1    Apr. 28, 2011

(30) Foreign Application Priority Data

Oct. 26, 2009 (TW) ................................ 98136414 A (51) Int. Cl.
*G06K 9/36* (2006.01)
(52) U.S. Cl. .......... 382/284; 382/285; 382/173; 348/43; 348/47
(58) Field of Classification Search .................. 382/284, 382/285, 173; 348/43, 47
See application file for complete search history.

(56) References Cited

U.S. PATENT DOCUMENTS

| 4,647,784 | A | 3/1987 | Stephens |
| 6,061,644 | A | 5/2000 | Leis |
| 7,015,831 | B2 | 3/2006 | Karlsson et al. |
| 7,057,548 | B1 | 6/2006 | Roberts |
| 7,135,992 | B2 | 11/2006 | Karlsson et al. |
| 7,145,478 | B2 | 12/2006 | Goncalves et al. |
| 7,162,338 | B2 | 1/2007 | Goncalves et al. |
| 7,177,737 | B2 | 2/2007 | Karlsson et al. |
| 2004/0168148 | A1 | 8/2004 | Goncalves et al. |
| 2005/0182518 | A1 | 8/2005 | Karlsson |
| 2007/0090973 | A1 | 4/2007 | Karlsson et al. |
| 2007/0262884 | A1 | 11/2007 | Goncalves et al. |
| 2009/0323121 | A1* | 12/2009 | Valkenburg et al. ......... 358/1.18 |

FOREIGN PATENT DOCUMENTS

WO    2007030026    3/2007

OTHER PUBLICATIONS

Bosse et al: "Keypoint design and evaluation for place recognition in 2D lidar maps", Elsevier, Jul. 24, 2009.*

* cited by examiner

*Primary Examiner* — Kathleen Y Dulaney
*Assistant Examiner* — Ruiping Li
(74) *Attorney, Agent, or Firm* — Jianq Chyun IP Office (57) ABSTRACT

A self-localization device and a method thereof are provided. The self-localization device has a movable carrier, a first laser image-taking device and a processor. The movable carrier can be moved and rotated on a plan. During the motion of the movable carrier, the first laser image-taking device disposed on the movable carrier acquires an i-th lot point data in the space at a time point $t_i$, where i is one index number from 1 to n, and n is an integer. The processor controls the first laser image-taking device, and receives coordinates of the i-th lot point data. The processor executes a K-D tree algorithm to perform a comparison and merge process between the first and the i-th lots point data, so as to establish a two dimensional profile.

20 Claims, 10 Drawing Sheets

SELF-POSITIONING DEVICE AND METHOD THEREOF

CROSS-REFERENCE TO RELATED APPLICATION

This application claims the priority benefit of Taiwan application serial no. 98136414, filed on Oct. 26, 2009. The entirety of the above-mentioned patent application is hereby incorporated by reference herein and made a part of this specification.

BACKGROUND OF THE INVENTION

1. Field of the Invention

The present invention relates to a localization technique. More particularly, the present invention relates to a localization device capable of self-localization and establishing a two-dimensional or a three-dimensional map, and a method thereof.

2. Description of Related Art

Generally, a three-dimensional (3D) geography information system (GIS) platform provided by Google Earth or Virtual Earth can only demonstrate 3D topographic information, while buildings, roads, trees and landscapes on a ground surface are manually constructed by using a 3D modelling software tool. To accurately and efficiently construct these 3D models on the ground surface, a 3D digital scan is a commonly used method. Presently, there are two main types of 3D digitalization tools, one type is to use a laser range finder with a fixed position on the ground, and the measurement is performed point by point as a radiation direction of the laser changes. However, it is inconvenient to move the laser range finder, and there are a plenty of measurement dead corners and a large amount of data positioning processing to be performed. Therefore, it is very inconvenient for scanning a large area. The other one is to use an external carrier to carry a laser equipment, and various methods are used to position the carrier, so as to estimate each measuring position of a sensor. For example, during an airborne ranging, an aircraft directly carries a radar or a laser range finder to scan all of the 3D information on the ground surface from the air, or a carrier purely moved on the ground localizes its own location through an active or a passive approach, so as to achieve the measurement purpose.

Presently, a 3D digitalization device with a high mobility, simple operation and suitable for a large street area and roads having different tortuous paths is required for quickly acquiring 3D information of the buildings or the landscapes from the ground.

SUMMARY OF THE INVENTION

A digitalization device with a high mobility, simple operation and suitable for a large-scale area and roads having different tortuous paths is described, which can quickly acquire two-dimensional (2D) or three-dimensional (3D) information of buildings or landscapes from the ground.

In addition, a k-dimensional tree (K-D tree) partition and merge method is developed for a movable carrier capable of moving on a plan, in which a global comparison can be processed. In this manner, a relative position of the carrier can be estimated. The carrier carries an image-taking device and other sensors required to be localized. The sensors can be further localized, so that a 2D or a 3D digital map can be established according to the localized sensors.

A self-positioning device is provided, comprising a movable carrier, a laser image-taking device and a processor. The movable carrier is suitable for performing a movement and a rotation on a plan, where the movement and the rotation are independent. The laser image-taking device is disposed on the movable carrier for acquiring an i-th lot point data in a space at a time point $t_i$ during a motion of the movable carrier, where i is an index number from 1 to n, and n is an integer. The processor is used for controlling the laser image-taking device, and receives coordinates of the i-th lot point data. The processor executes a K-D tree algorithm to perform a comparison and merge process to a first and the i-th lots point data, so as to establish a two dimensional (2D) profile.

In addition, a self-positioning device is provided, comprising a movable carrier, a first laser image-taking device, at least one second laser image-taking device and a processor. The movable carrier is suitable for performing a movement and a rotation on a plan, where the movement and the rotation are independent. The first laser image-taking device is disposed on the movable carrier for acquiring an i-th lot point data along a first direction in a space at a time point $t_i$ during a motion of the movable carrier, where i is an index number from 1 to n, and n is an integer. The second laser image-taking device is disposed on the movable carrier for acquiring a j-th lot point data along a second direction in the space at a time point $t_j$ (j is an index number from 1 to m, and m is an integer). The processor is used for controlling the first and the second laser image-taking devices, and receiving coordinates of the i-th lot point data obtained by the first laser image-taking device and coordinates of the j-th lot point data obtained by the second laser image-taking device (i and j are index numbers and have maximum values n and m, respectively). The processor executes a K-D tree algorithm to perform a comparison and merge process to a first lot point data and the i-th lot point data obtained by the first laser image-taking device, so as to establish a 2D profile. Moreover, the processor restores a 3D map according to the 2D profile and the j-th lot point data obtained by the second laser image-taking device.

The present invention further provides a method for self-localization. A first laser image-taking device is used to acquire an i-th lot point data in a space at a time point $t_i$ when a movable carrier moves, where i is an index number from 1 to n, and n is an integer. A processor is used to execute a K-D tree algorithm to perform a comparison and merge process to a first lot point data and the i-th lot point data obtained by the first laser image-taking device, so as to establish a 2D profile.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The present embodiment is to achieve a self-localization function of a movable carrier without applying a pre-calibration and an extra target. Once the movable carrier can be self-localized, it represents that any image-taking device (for example, a laser, or a charge-coupled device (CCD), etc.) carried by the movable carrier can be localized. In other words, three-dimensional (3D) information obtained by the image-taking device can also be localized.

The localization issue to be solved in the present embodiment only involves the localization for relative positions. Namely, a departure point of the movable carrier is taken as an origin of the coordinates, and all of the position variations are referred to the origin. In the present embodiment, in allusion to, it is to solve the localization issue of a planar motion in an unknown environment, in which the self-localization can be achieved by only one sensor device, and the movable carrier can be moved in any horizontal motion mode. Once the movable carrier is localized, the other devices on the movable carrier can also be localized through a synchronization or an interpolation algorithm. In the present embodiment, a camera and a laser are carried to capture geometric topology of the ground, and the environment information can be restored to construct 3D geometric topology and color information in the space.

Figure 1:
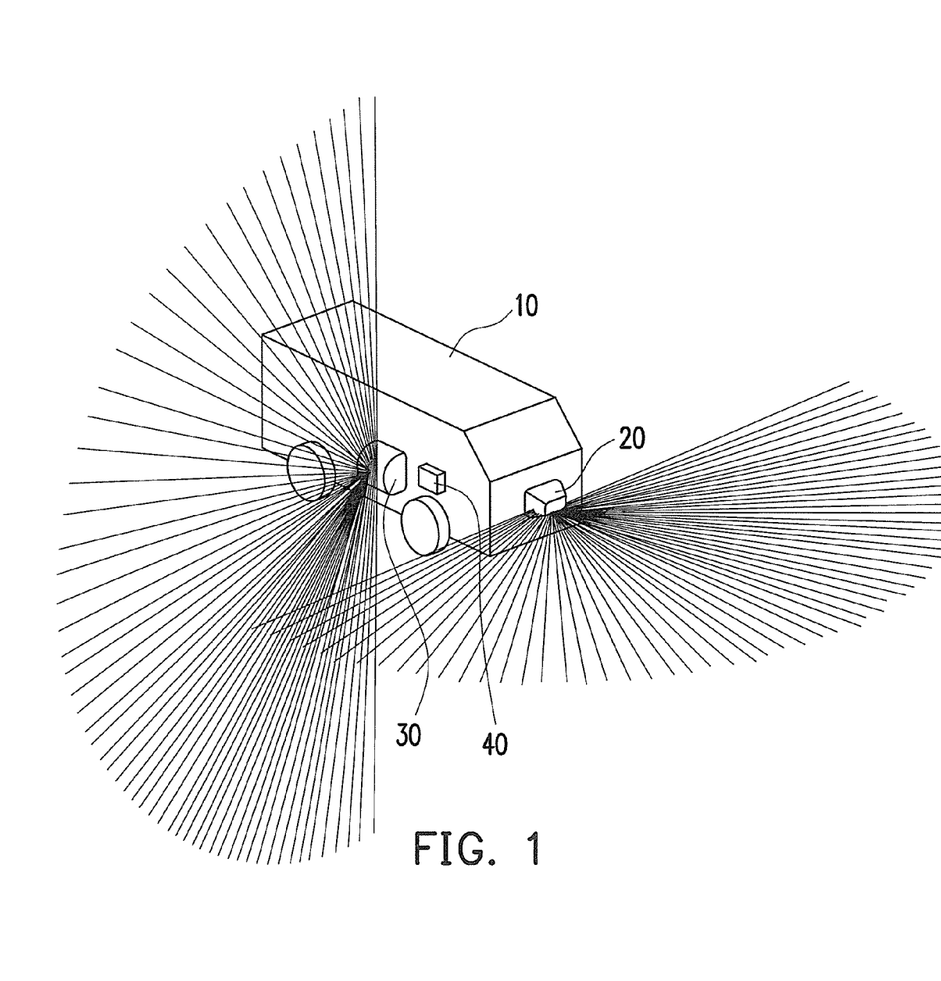
FIG. 1 is a schematic diagram illustrating a hardware configuration according to an embodiment of the present invention.

FIG. 1 is a schematic diagram illustrating a hardware configuration of the embodiment. As shown in FIG. 1, a first laser image-taking device used for localization calculation is disposed on a movable carrier 10. The first laser image-taking device can be a light detection and ranging device (LiDAR), or referred to as a laser ranging device that uses laser beams to perform a scan-type ranging. In all of the following embodiments, the laser image-taking device is taken as an example for description, not for limiting the present invention.

Moreover, the self-localization device of the present embodiment can also comprise a processor and a storage device, etc., which are used for controlling the laser image-taking device and processing data transmission, calculation and storage, etc.

In addition, the movable carrier 10 is suitable for moving and rotating horizontally on a plane. It should be noticed that in the present embodiment, the movable carrier 10 can be also allowed to perform an in-situ rotation to implement the self-localization. The movable carrier 10 can be a wheel carrier or a non-wheel carrier. The wheel carrier can be a single-wheel carrier or a multi-wheel carrier, for example, an automobile or a motorcycle, etc. with four wheels, three wheels, two wheels or a single wheel. Moreover, the movable carrier can be a device powered by fuel, electricity or human-power (for example, a trolley, etc.). In addition, the non-wheel carrier can be a track device, a ball-type device, a rail-type device or a magnetic levitation device, etc. Furthermore, the movable carrier 10 can also be a self-propelled robot, a track or slide device, etc. The motion mode of the movable carrier 10 is not particularly limited if the movable carrier 10 can move on a substantially flat ground.

The motion mode of the movable carrier 10 has three degrees of freedom (DOF) (two translations and one rotation), and the three DOFs are mutually independent. Therefore, the movable carrier 10 can be simply moved forward/backward, simply shifted to the left/right, simply rotated, or can be moved according to a combination mode of the above three motion modes. Moreover, in the present embodiment, the movable carrier 10 is unnecessary to carry an extra sensor (for example, a pedometer, etc. used for counting a walking distance).

Figure 2A:
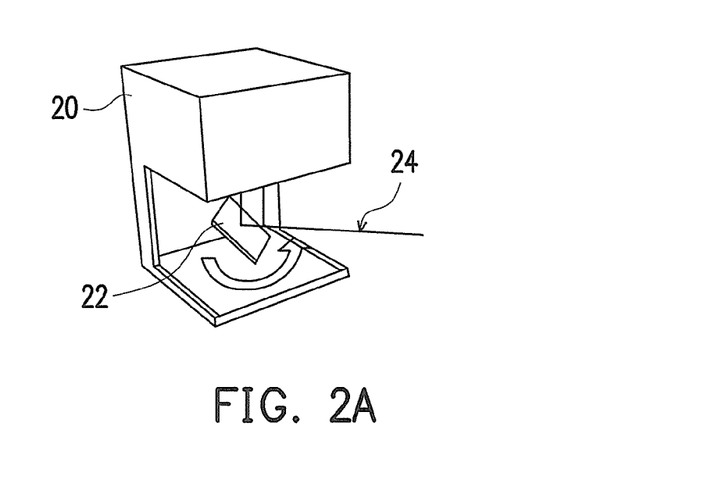
FIGS. 2A, 2B and 2C are schematic diagrams illustrating an operation principle of a laser range finder.
Figure 2B:
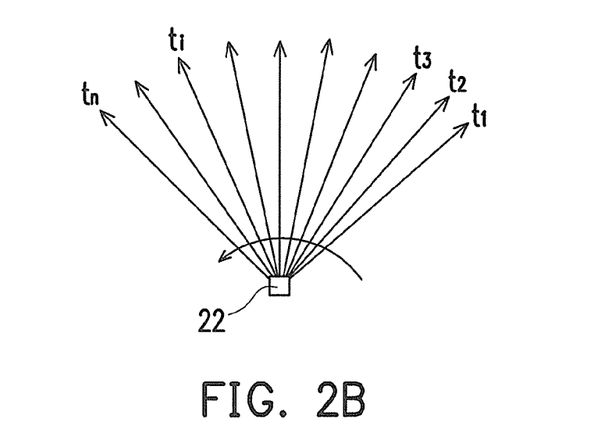
Figure 2C:
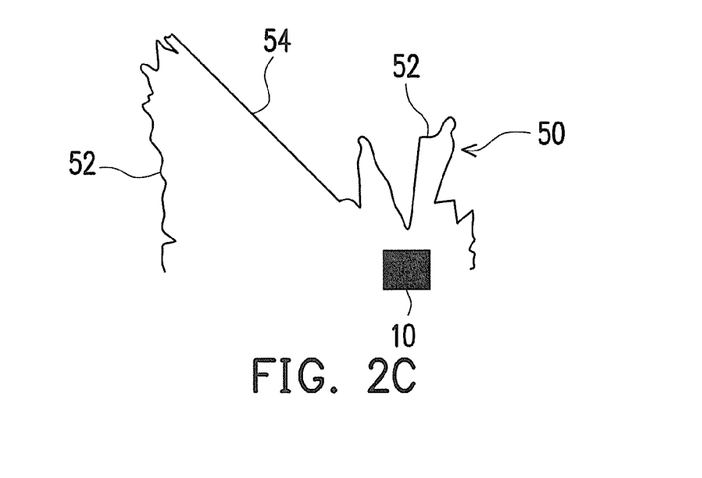

FIGS. 2A, 2B and 2C are schematic diagrams illustrating an operation principle of the laser image-taking device. FIG. 2A illustrates mechanism of a rotating reflection mirror in the laser image-taking device, by which data captured by the laser beam are within an angular range. FIG. 2B is a schematic diagram illustrating different pointing directions of the laser beam at different time points. FIG. 2C illustrates a profile (top view) actually obtained by the laser image-taking device after the laser image-taking device is operated for one cycle.

As shown in FIG. 2A, the laser image-taking device 20 comprises a laser source (not shown) for emitting a laser beam 24. After the laser beam 24 reaches a target, the laser beam 24 is reflected back to the laser image-taking device 20 along the original incident path, so as to obtain distance data. Moreover, the laser image-taking device 20 further has a reflection mirror 22, which can be rotated around a rotation axis, so that the laser beam 24 can scan targets within a predetermined range (a predetermined angular range).

FIG. 2B is a schematic diagram of a scan result for each scan cycle of the laser beam. At each time point, the laser image-taking device 20 or 30 performs one cycle of scan. Namely, within the available angular range (for example, a rotation range of the reflection mirror 22 of FIG. 2A), the laser image-taking device 20 or 30 constantly emits the laser beam, receives the laser light reflected by objects on the ground, and calculates distances according to the received reflected laser light. The scan times for one cycle are ranged from $t_1$ to $t_n$.

As shown in FIG. 2C, a scan result is illustrated, and the scan result is, for example, obtained when the movable carrier 10 is located at the origin. When the movable carrier 10 is located at the origin, the first laser image-taking device 20 of FIG. 1 performs one cycle of scan within a scan range (shown as $t_i$ to $t_j$, of FIG. 2B) to obtain a scan data 50, which consists of a plurality of point data, i.e., a landform profile 52 obtained from the laser beams reflected by the objects on the ground. If the scan beam cannot reach an object on the ground, namely, there is no reflected laser beam, a straight line 54 as that shown in FIG. 2C is then obtained. A 2D profile as that shown in FIG. 2C can be obtained according to the point data obtained via one cycle of scan and the calculated distances.

When the movable carrier 10 is continually moving forward, the profile information obtained at each time point can be integrated and combined to obtain an integral 2D planar profile, so as to achieve a positioning effect.

Moreover, the movable carrier 10 can further carry one or more laser image-taking devices. For example, in another embodiment, the movable carrier 10 can further carry a second laser image-taking device 30. In addition, the movable carrier 10 can also carry another image-taking device 40, for example, a charge-coupled device (CCD) (color or black and white, etc.).

Figure 3:
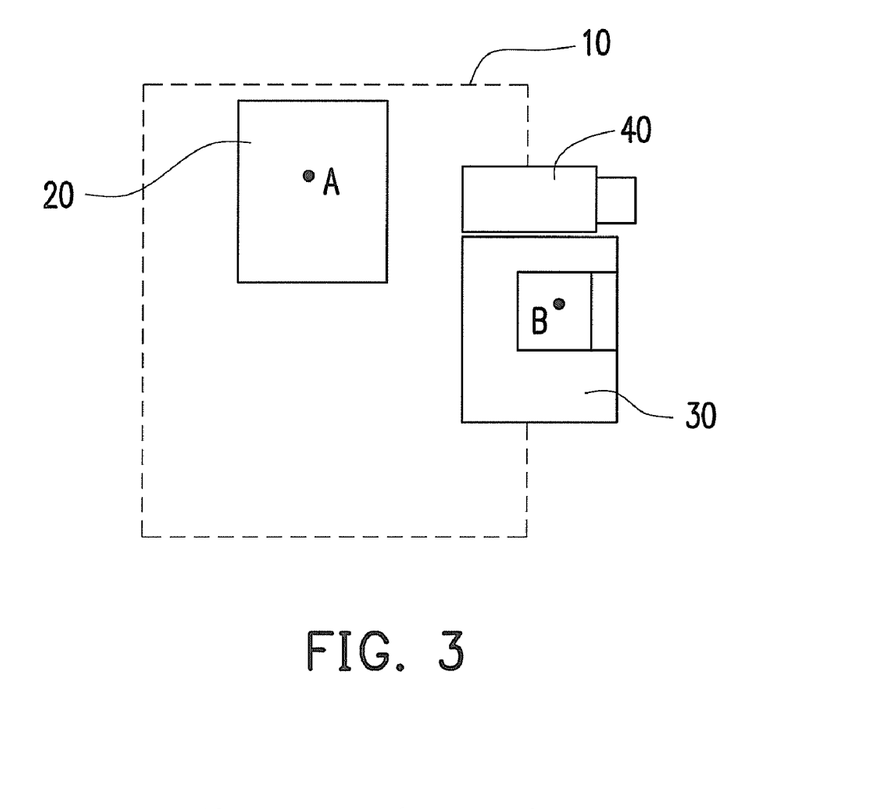
FIG. 3 is a schematic diagram illustrating various laser image-taking devices and image-taking devices configured on a movable carrier.

FIG. 3 is a schematic diagram illustrating various laser range finders and image-taking devices arranged on the movable carrier. As shown in FIG. 3, besides the first laser image-taking device 20 (the LiDAR laser image-taking device in the present embodiment), the movable carrier 10 further carries the second laser image-taking device 30 (the LiDAR laser image-taking device in the present embodiment), and an image sensor device 40 (for example, a CCD, etc). In the present embodiment, the image sensor device 40 is, for example, a color CCD (a digital camera, etc.).

In the present embodiment, since the sensor devices (for example, 20, 30 and 40, etc.) are all fixed on the movable carrier 10, relative positions among the sensor devices are determined. Namely, as long as one of the sensor devices is localized, the other sensor devices can be accordingly localized, and no extra localization devices are required. As shown in FIG. 3, the coordinate center A of the first laser image-taking device 20 is different from the coordinate center B of the second laser image-taking device 30 by a translation vector AB, so that as long as the first laser image-taking device 20 is localized, the relative position of the second laser image-taking device 30 is also localized. In other words, a spatial conversion relationship between the first laser image-taking device and the other sensors can be easily obtained through the mechanism arrangement.

Under such configuration, once the movable carrier 10 is self-localized, it represents that any of the image-taking devices (for example, the laser and the CCD, etc.) configured on the movable carrier 10 is localized. In other words, the 3D information obtained by the image-taking devices is also localized. For example, the 3D information is restored according to the planar information (in a horizontal direction) obtained by the first laser image-taking device 20 and the planar information (in a vertical direction) obtained by the second laser image-taking device 30.

Under the hardware configuration of the present embodiment, only one laser image-taking device (for example, LiDAR) is carried to serve as a planar localization device, and the other devices carried by the movable carrier 10 can also be localized according to a synchronization or an interpolation algorithm (which will be described later), so that a 3D image capture can be achieved.

Moreover, in the present embodiment, only one laser image-taking device (LiDAR) is used for localization calculation, and such laser imaging device (for example, the first laser image-taking device 20 of FIG. 1) is disposed in the front of the movable carrier 10 for measuring distances, which uses a rotating reflection mirror to obtain the distance data. In addition, the second LiDAR (or more than two LiDARs) and the color CCD, etc. are used for obtaining geometric information and color information of the environment space.

The calculation of the present embodiment is described below. The calculation can be implemented by software, which mainly comprises two parts. One is a localization calculation, and another one is a synchronization (or interpolation) calculation. According to the localization calculation, a k-dimensional tree (K-D tree) partition method is used to search, compare, integrate and merge the data gathering by the laser image-taking device (LiDAR), and a weighted iterative closest point (ICP) is performed to compare the current position and status with the point data in the K-D tree, so as to construct a map. Moreover, regarding the synchronization calculation, when one laser image-taking device (LiDAR) is localized, status and positions of the other laser image-taking devices or sensor devices at each time point can be calculated according to the synchronization scheme (or software interpolation), so as to achieve the 3D image capture.

First, the localization calculation is described. In the present embodiment, a localization calculation, similar to that used in field of robot technology, can be used. In the robot technology, the robot can obtain a relative relationship between itself and the environment, which is similar to that a human being perceives surrounding environment. Generally, one can describe his/her own position according to nearby reference objects. Similarly, the robot can also describe the relative relationship between itself and the environment according to the same approach, so as to reconstruct its own absolute position.

Figure 4:
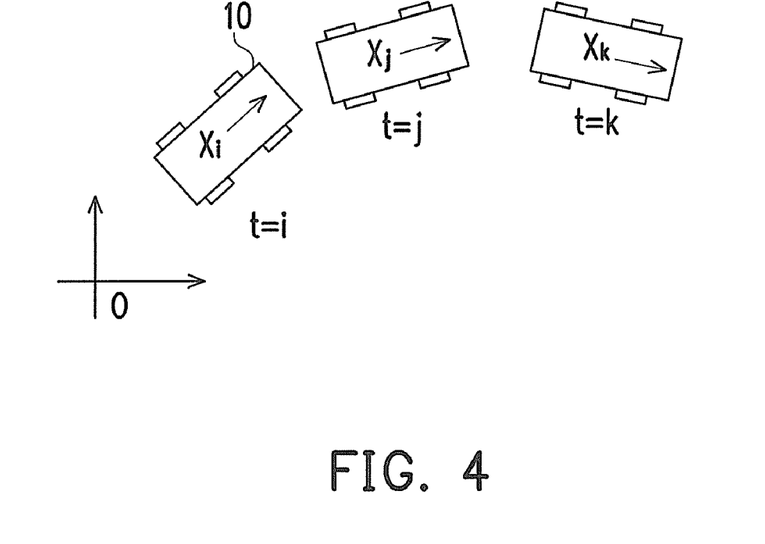
FIG. 4 is a schematic diagram illustrating a motion of a movable carrier on a plane.

FIG. 4 is a schematic diagram illustrating a motion of the movable carrier on a plane. As shown in FIG. 4, the movable carrier 10 (or a robot) is assumed to be moved on a horizontal plane, and a coordinate system applied here is referred to as a Cartesian coordinate. A position shift of the movable carrier 10 between an i-th time point and a j-th time point is represented by a vector $x_{ij}$. The vector $x_{ij}$ represents that when the movable carrier 10 moves from the i-th time point to the j-th time point, the movable carrier 10 is be first rotated by an angle $\theta_{ij}$, and then moved with a distance of $(x_{ij}, y_{ij})$, as that shown in a following equation (1). Similarly, a position shift of the movable carrier 10 from the j-th time point to the k-th time point is represented by a vector $x_{jk}$, as that shown in a following equation (2). Assuming that the i-th time point is taken as the origin (or the departure point), the vector $x_{ij}$ represents a position status of the movable carrier 10 at the j-th time point. Similarly, the vector $x_{jk}$ represents a position status of the movable carrier 10 at the k-th time point.

In this way, the speed of the movable carrier 10 can be obtained according to a ratio between the position difference and the time difference, and an acceleration value of the movable carrier 10 can be further calculated according to a speed difference. A vector $x_{ik}$ can be obtained according to a compounding operator of the vectors $x_{ij}$ and $x_{jk}$, and an operator "$\oplus$" is referred to as the compounding operator, as that shown in a following equation (3). Here, the position of the movable carrier 10 is represented by one vector, and the vector includes two motion modes, i.e., rotation and translation.

$$x_{ij} = \begin{bmatrix} x_{ij} \\ y_{ij} \\ \theta_{ij} \end{bmatrix} \quad (1)$$

$$x_{jk} = \begin{bmatrix} x_{jk} \\ y_{jk} \\ \theta_{jk} \end{bmatrix} \quad (2)$$

$$x_{ik} = \oplus(x_{ij}, x_{jk}) \begin{bmatrix} x_{jk}\cos\theta_{ij} - y_{jk}\sin\theta_{ij} + x_{ij} \\ x_{jk}\sin\theta_{ij} + y_{jk}\cos\theta_{ij} + y_{ij} \\ \theta_{ij} + \theta_{jk} \end{bmatrix} \quad (3)$$

As described above, the vector $x_{ij}$ represents that when the movable carrier 10 is moved from the i-th time point to the j-th time point, the movable carrier 10 has to be first rotated by the angle $\theta_{ij}$, and then moved by the distance $(x_{ij}, y_{ij})$. In other words, if the time sequence is reversed and when the movable carrier 10 is moved back from the j-th time point to the i-th time point, the movable carrier 10 is first moved for the distance $(-x_{ij}, -y_{ij})$, and then rotated by an angle $-\theta_{ij}$. Here, an inverse operator "⊖" is defined, so that the vectors $x_{ij}$ and $x_{ji}$ can satisfy an inverse operation as that shown in a following equation (4).

$$(x_{ji}) = ⊖(x_{ij}) \begin{bmatrix} -x_{ij}\cos\theta_{ij} - y_{ij}\sin\theta_{ij} \\ x_{ij}\sin\theta_{ij} + y_{ij}\cos\theta_{ij} \\ -\theta_{ij} \end{bmatrix} \quad (4)$$

According to the equations (3) and (4), it is easy to deduce an absolute position of the movable carrier 10 according to a relationship between two consecutive time points of the movable carrier 10. Theoretically, a position of the movable carrier 10 at the n-th time point can be deduced by a series of estimations according to a following equation (5).

$$x_0n = ⊕(\ldots ⊕(⊕(x_{01}, x_{12}), x_{23}), \ldots, x^{(n-1)n}) \quad (5)$$

However, although the deduction method of the equation (5) is intuitive and simple, such deduction method is liable to quickly accumulate errors of the measured data. In view of the measurement, any sensor has a measurement uncertainty, and the measurement uncertainty is generally described or recorded by an error. According to a previous research data, the errors can be quickly accumulated during a motion of the movable carrier (or the robot), wherein an angle error accumulation is far more quicker than a position error accumulation. Therefore, in actual applications, artificial markers are suitably added to compensate the errors. According to a theoretical analysis, if the absolute position of the movable carrier at each time point is required to be calculated, a relative relationship between each two consecutive time points has to be obtained in advance, which involves a corresponding relationship of two sets of data. Here, an iterative closest point (ICP) method is used to solve such problem and eliminate problems probably occurred during the measurement.

Regarding a comparison of two consecutive lots of scan points, an optimal relative displacement vector $[\Gamma_x, \Gamma_y, \Gamma_\theta]^T$ can be calculated according to following equations (6) and (7), where the equation (6) is a target function of the ICP. In two sets of data sequences to be compared, corresponding points of the two sets are assumed to be $a^i$ and $b^i$, and a number of the corresponding points is n, and a vector $\Gamma'''=[\Gamma_x, \Gamma_y, \Gamma_\theta]^T$, which satisfies the equation (6), so that E may have a minimum value, which represents that after the corresponding point $b^i$ is moved for a vector $\Gamma$, a distance variation between the corresponding points $b^i$ and $a^i$ is the minimum, a solution thereof is shown as the equation (7).

$$E = \sum_{i=1}^{n} \| ⊕(\Gamma', b^i) - a^i \| \quad (6)$$

$$\Gamma_\theta = \tan^{-1}\left(\frac{\sum a_x b_y - \sum a_y b_x}{\sum a_x b_x - \sum a_y b_y}\right)$$

$$\Gamma_x = \overline{a_x} - (\overline{b_x}\cos\Gamma_\theta - \overline{b_y}\sin\Gamma_\theta)$$

$$\Gamma_y = \overline{a_y} - (\overline{b_x}\sin\Gamma_\theta - \overline{b_y}\cos\Gamma_\theta)$$

-continued $$\overline{a_x} = \frac{1}{n}\sum_{i=1}^{n} a_x^i, \quad (7)$$

$$\overline{a_y} = \frac{1}{n}\sum_{i=1}^{n} a_y^i,$$

$$\overline{b_x} = \frac{1}{n}\sum_{i=1}^{n} b_x^i,$$

$$\overline{b_y} = \frac{1}{n}\sum_{i=1}^{n} b_y^i,$$

$$\sum a_x b_x = \sum_{i=1}^{n} (a_x^i - \overline{a_x})(b_x^i - \overline{b_x}),$$

$$\sum a_y b_y = \sum_{i=1}^{n} (a_y^i - \overline{a_y})(b_y^i - \overline{b_y}),$$

$$\sum a_y b_x = \sum_{i=1}^{n} (a_y^i - \overline{a_y})(b_x^i - \overline{b_x}),$$

$$\sum a_x b_y = \sum_{i=1}^{n} (a_x^i - \overline{a_x})(b_y^i - \overline{b_y})$$

Where $(a_x^i, a_y^i)$ and $(b_x^i, b_y^i)$ are the corresponding points of two lots of scan data, and in an ICP application, the corresponding points have to satisfy conditions of "closest distance" or "highest similarity". In the present embodiment, a long distance laser scanner (LMS-291) manufactured by a German SICK Company is used as an experiment equipment, and a scan result thereof is a series of point data, which covers a cross-section. In a high transmission mode (RS-422 interface) of such equipment, 37.5 times complete scan (including 361 points, and in a 180-degree plane, scan of each 0.5 degree can obtain one reflection point data) of a single cross-section can be achieved in each second.

According to the above descriptions, merge of any lot of scan data has to be calculated according to the ICP method, and the comparison is performed only during several successive scans. Therefore, the comparison is time-consuming and an opportune calculation cannot be achieved. To improve a calculation efficiency and achieve a global comparison, the present embodiment provides a K-D tree structure, for example, a 4-dimensional tree structure, in which each lot scan data is merged into the quad tree structure, and a data structure thereof is as that shown in FIG. 5A.

Figure 5A:
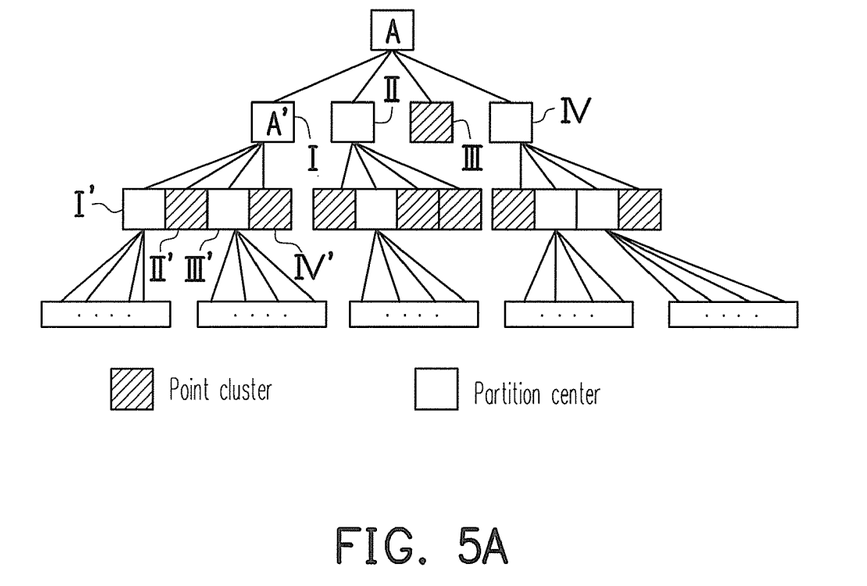
FIGS. 5A and 5B are schematic diagrams respectively illustrating a K-D tree and a corresponding scan profile.
Figure 5B:
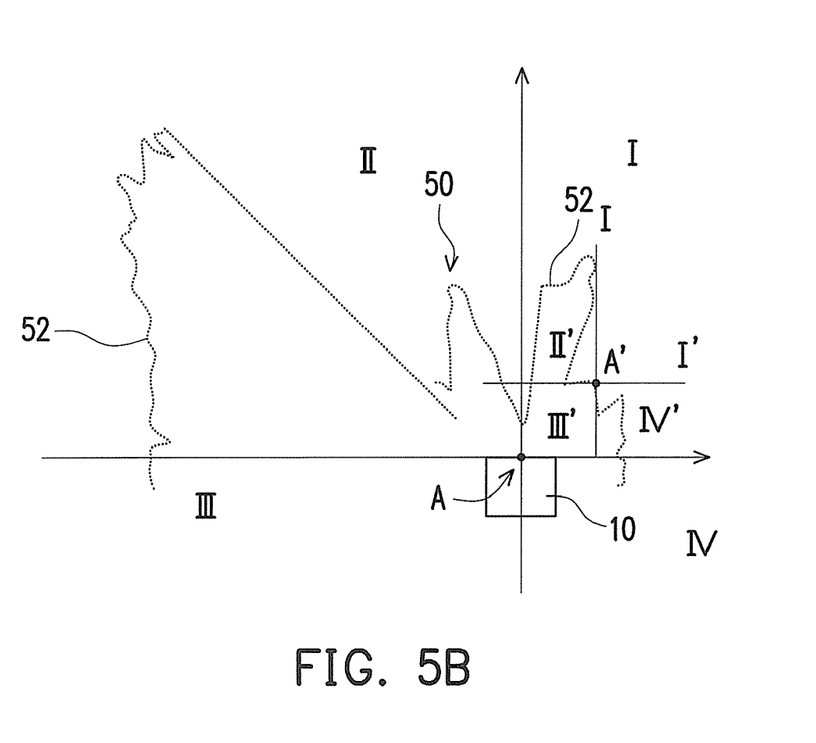

First, referring to FIGS. 5A and 5B, FIG. 5A is an example of a 4-dimensional tree, which has a four-layer structure, wherein each layer has a plurality of nodes (which are also referred to as subspaces or branches). Each node of each layer can extend downwards to derive a plurality of nodes, and each node consists of a plurality of point data. FIG. 5B is a variation of the aforementioned FIG. 2C. A start point of the movable carrier 10 is defined as the origin, and the 2D profile is divided into four quadrants I, II, III and IV while taking the origin as a center. Referring to FIGS. 5A and 5B, the origin A corresponds to a top node A in the quad tree of FIG. 5A. Then, the node A extends downwards to derive four nodes (the second layer), and each node corresponds to one of the four quadrants I, II, III, IV of FIG. 5B.

In FIG. 5B, the point data of the 2D profile obtained at one time point (the origin) are divided into four regions (quadrants, subspaces), and the point data in each quadrant are respectively filled in the corresponding nodes of the 4-dimensional tree. In the present embodiment, a center point A' can be further selected from the quadrant I to serve as a node A' of the second layer of the 4-dimensional tree. Similarly, the region I is divided into four quadrants I', II', III' and IV' with reference of the center point A', and the four quadrants I', II', III' and IV' correspond to the third layer of the quad tree of FIG. 5A. Whether the subspace is divided can be determined according to a point density of each node (subspace), and if the point density is higher than a predetermined value, such node is divided to derive a new layer. The point data of each of the regions I', II', III' and IV' are filled in the corresponding nodes. By such means, a 4-dimensional tree structure corresponding to a specific time point is obtained. Wherein, the region that is not further divided is referred to as a point cluster, and the region that can be further divided is referred to as a partition center. According to the method of the present embodiment, the 4-dimensional tree data structure established corresponding to each time point is used to perform the comparison, merge, and integration processes to establish an integral 2D planar profile.

Then, comparison and integration of two lots of scan data are described with reference of FIGS. 6A-6D. First, at the time point $t_i$, the laser image-taking device on the movable carrier 10 acquires an i-th lot point data, which represents a profile of ground objects at the time point $t_i$ as that shown in FIG. 6A. Next, at the time point $t_{i+1}$, the laser image-taking device on the movable carrier 10 obtains an (i+1)-th lot point data, which represents a profile of ground objects at the time point $t_{i+1}$ as that shown in FIG. 6B. The ground objects are basically fixed, and some of the targets are the same during a motion of the movable carrier 10. Therefore, the two lots point data obtained at the time point ti and the time point $t_{i+1}$ have a high repeatability.

Figure 6A:
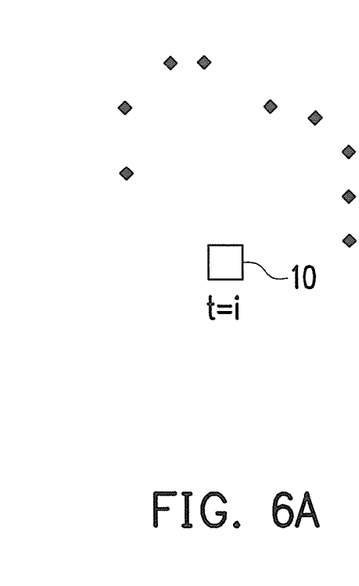
FIGS. 6A-6D are schematic diagrams illustrating a comparison and merge process of two lots of scan data points.
Figure 6B:
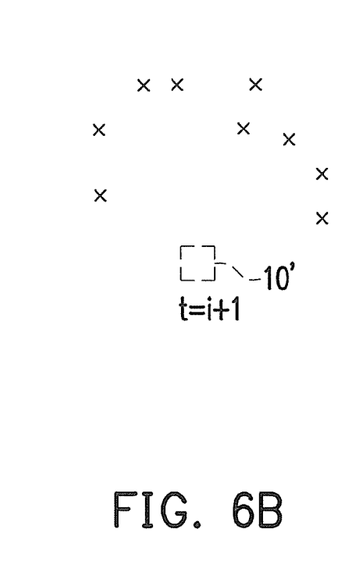
Figure 6C:
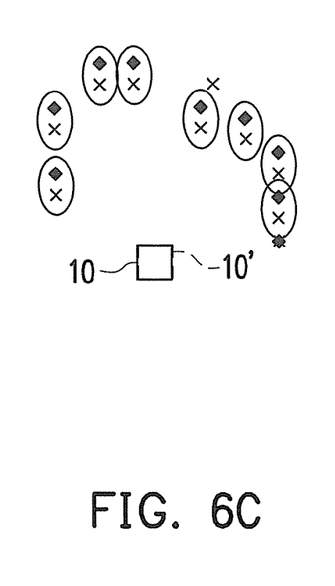

Then, as shown in FIG. 6C, the point data of FIG. 6A and FIG. 6C are compared, and it is discovered that many point data correspond to the corresponding points of the same ground objects, for example, the points in the encircled parts. Moreover, points can also be added or reduced during the scan performed at the time point $t_{i+}$, for example, the point that is not encircled in FIG. 6C.

Figure 6D:
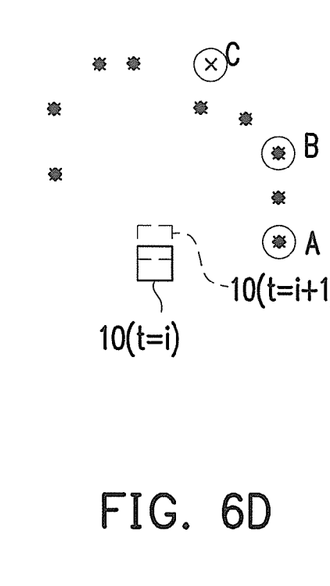

Thereafter, the profile is restored as that shown in FIG. 6D, the point data corresponding to the same corresponding points are overlapped, which are shown by symbols "*". A symbol C represents a new data point added at the time point $t_{i+1}$, and a symbol A represents a data point that is not appeared at the time point $t_{i+1}$. A symbol B is, for example, defined as a weighted data point.

Regarding the above added data point, in the 4-dimensional tree data structure of FIG. 5A, one of the partition center continually extends downwards to derive a branch. By such means, a complete 4-dimensional tree structure can be established, so a to restire a complete 2D profile.

Then, a calculation flow of the K-D tree is described with reference of FIGS. 7A-7D and FIG. 8.

With reference of FIG. 1, first, in a step 110 of FIG. 8, the current position of the movable carrier 10 is defined as the origin, and a main LiDAR (i.e., the first laser image-taking device 20) is used to scan the ground objects to obtain a first lot scan data, so as to establish a 4-dimensional tree (which is shown on the left of FIG. 7A), wherein a method of establishing the quad tree is similar as that described with reference of FIGS. 5A and 5B. Steps 110, 112, 114, 116 and 118 of FIG. 8 include following processes.

(i) The current position is defined as the origin, and a 4-dimensional tree structure is established according to the first lot scan data.
(ii) The i-th lot scan data is compared to the 4-dimensional tree structure to find a point data closest to the i-th lot point data from each of the nodes in the 4-dimensional tree structure to serve as a comparison point.
(iii) The i-th lot point data is calculated according to the weighted ICP method, and a conversion matrix $M'_{0i}$ is multiplied, so that this lot point data is closed to a position represented by the 4-dimensional tree. When an error is smaller than a predetermined value, or when times of iteration is higher than a predetermined value, a step (iv) is executed. Otherwise, the step (ii) is repeated.
(iv) The i-th lot point data is merged into the 4-dimensional tree, by which each lot point data is distributed to the corresponding node (subspace) of the 4-dimensional tree. If two point data in each node are closed enough, the two point data are merged according to a weighting function.
(v) A point density of each node is determined, and if the point density is higher than a predetermined value, such node is divided.
(vi) A current position and status (including a speed and an angular speed) are recorded, and the step (ii) is repeated to perform the next scan (i=i+1).

Figure 7A:
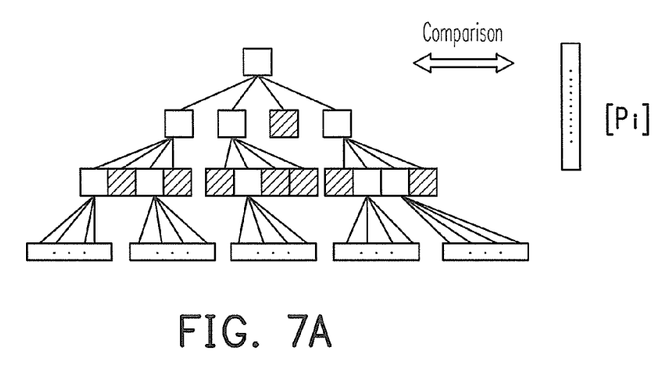
FIGS. 7A-7D are schematic diagrams illustrating a comparison and merge steps of a K-D tree.
Figure 7B:
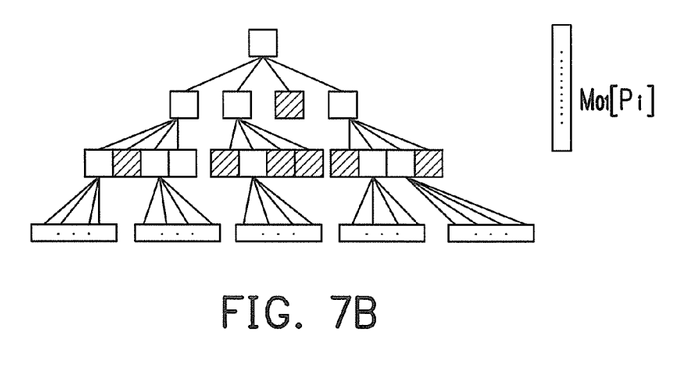
Figure 7C:
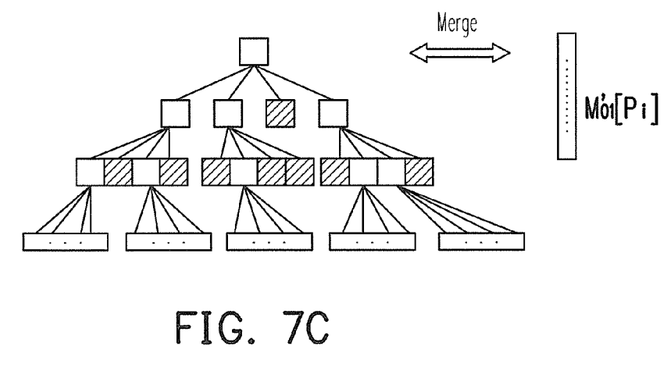
Figure 7D:
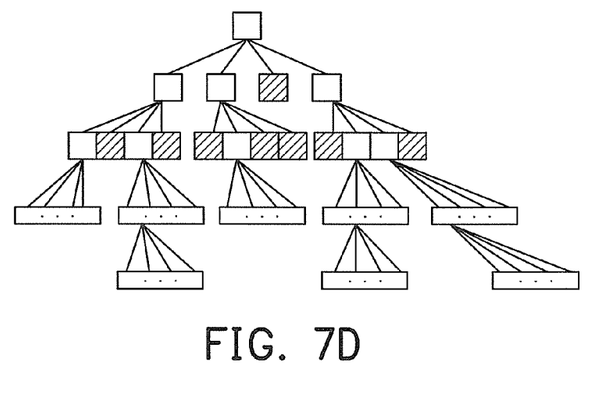
Figure 8:
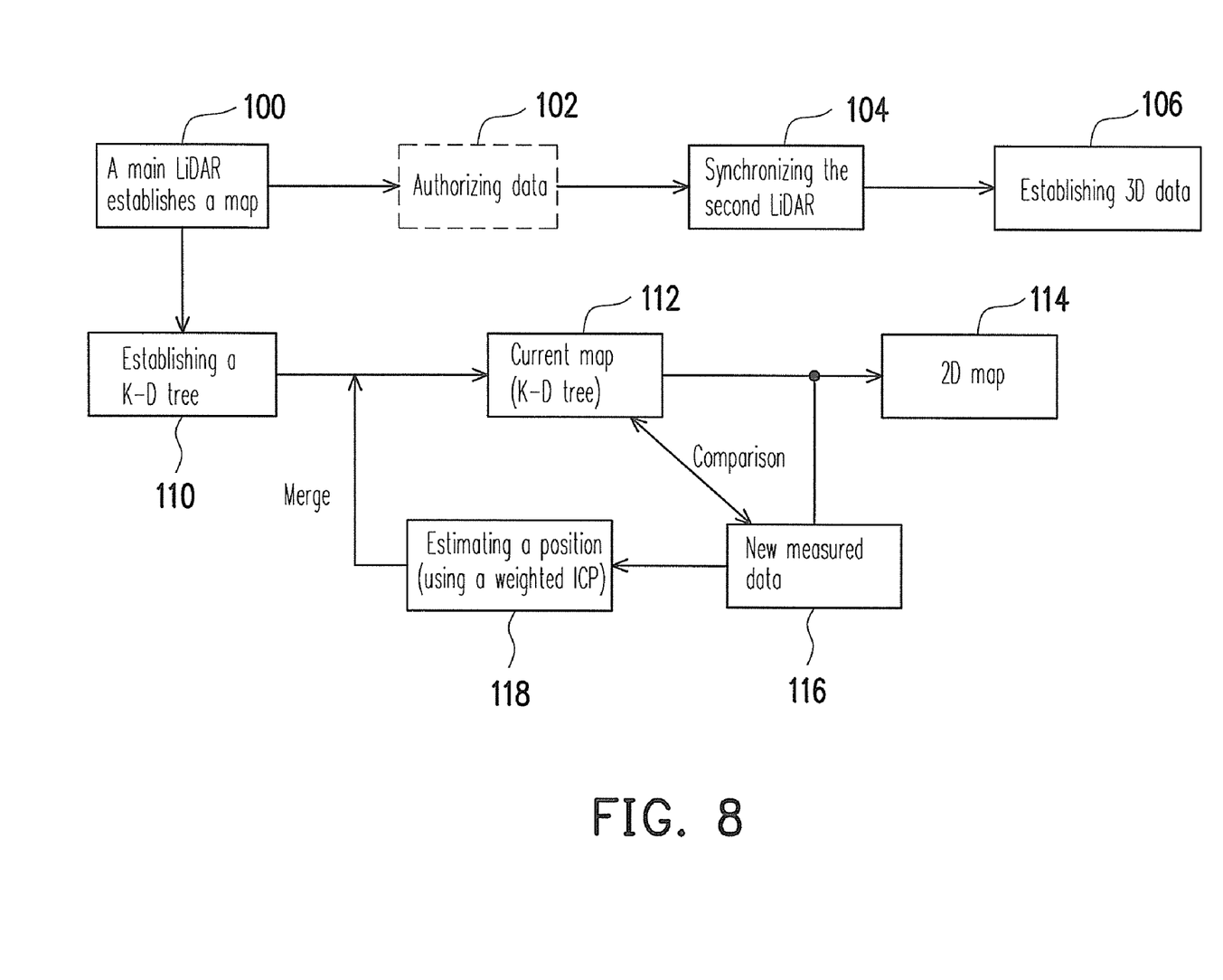
FIG. 8 is a flowchart illustrating processes for establishing a 2D profile and a 3D map.

The above steps (i)-(vi) are the steps 110-118 of FIG. 8. And an actual operational concept of the 4-dimensional tree is as that shown in FIGS. 7A-7D. After the i-th lot point data ($[P_i]$) is obtained, $[P_i]$ represents the current position and direction status of the movable carrier 10, the closest corresponding point can be found through a position comparison of the 4-dimensional tree (FIG. 7A). Then, the position $[P_i]$ is changed to $M'_{0i}[P_1]$ after the iterations of the weighted ICP are performed (FIG. 7B). Then, each lot point data is merged into the quad tree (FIG. 7C). Finally, a new 4-dimensional tree is generated as that shown in FIG. 7D.

Now, a method of integrating the other sensors on the movable carrier 10 is described. As described above, after the localization calculation is performed through the first laser image-taking device 20, a motion path of the movable carrier 10 is clearly determined. Moreover, when the second laser image-taking device 30 (used for scanning another direction) is carried on the movable carrier 10, the corresponding status data (i.e. the scan data of the second laser image-taking device 30) can be obtained at each time point, and according to these information, the positions of the other sensors can be calculated by using the synchronization technique or the interpolation technique.

Figure 9:
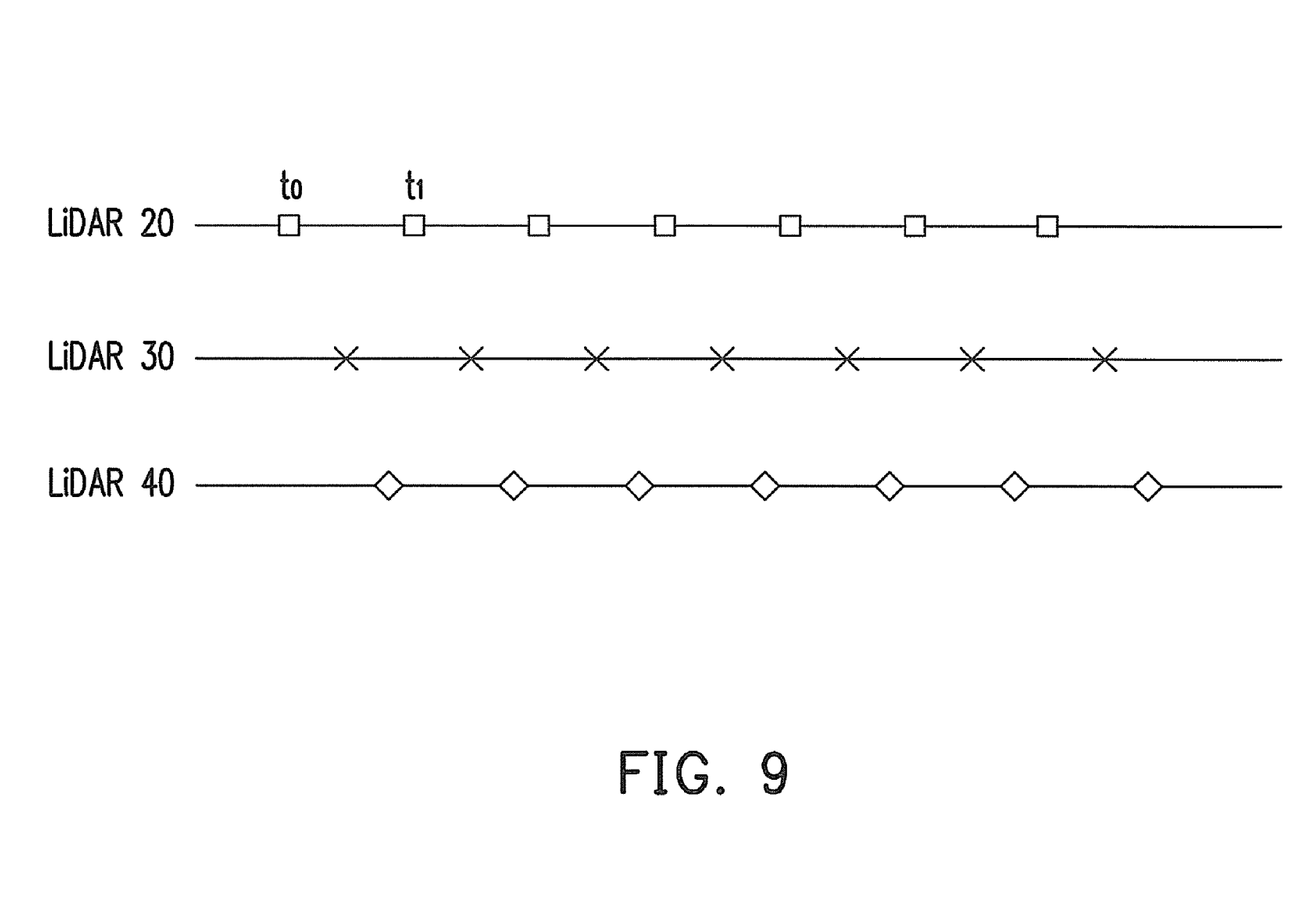
FIG. 9 is a schematic diagram illustrating localization of two laser range finders according to an interpolation method.

In case that the synchronization technique is used, there exits only position difference (including direction) between the first laser image-taking device (LiDAR) and the other sensor device. Therefore, only a 4×4 matrix is required to convert the two coordinate systems. In case that software synchronization is used for processing, the interpolation technique is required. As shown in FIG. 9, the imaging operations performed by the first laser image-taking device 20 (LiDAR) occurs along a time axis marked with blocks. If another laser image-taking device (for example, LiDAR 30 or CCD 40, etc.) is used, a time point t of the imaging operation thereof is between time points $t_0$ and $t_1$, so that a position obtained via the interpolation technique is shown as a following equation (8). The positions of the first laser image-taking device 20 (LiDAR) corresponding to the time points $t_0$ and $t_1$ are respectively $x_{M|t0}$ and $x_{M|t0}$, and when the second laser image-taking device (LiDAR) 30 perform the imaging operation at the time point t, a most possible position of the first laser image-taking device (LiDAR) 20 is $x_{s|t}$, which can be easily calculated.

Therefore, regarding a coordinate system (P') of the second laser image-taking device (LiDAR), the coordinate ($P_S$) of the first laser image-taking device 20 (LiDAR) corresponding to the time point t can be converted through the 4×4 conversion matrix, as that shown in a following equation (9). The 4×4 conversion matrix can be calculated according to a design of a figure (for example, FIG. 3) or obtained through other calibration methods. In the present embodiment (regarding the design of FIG. 3), the coordinate conversion of the second laser image-taking device 30 (LiDAR) and the color CCD 40 relative to the first laser image-taking device 20 (LiDAR) are respectively shown as following equations (10) and (11), and the equations (10) and (11) are only used as examples.

device such as the color CCD also can be localized, and the point data obtained by the other laser image-taking devices (LiDAR) can be restored in the space to establish a 3D map.

In summary, in the present embodiment, a 2D localization map can be obtained by using a simple hardware structure including a movable carrier capable of performing a horizontal movement and a rotation, a laser device used for localizing, a device for transmission, calculation and storage, and $$x_S|_t = x_M|_{t_0} + \frac{t - t_0}{t_1 - t_0}(x_M|_{t_1} - x_M|_{t_0}) \tag{8}$$

$$P' = M_{4\times 4} P_s \tag{9}$$

$$M_{4\times 4} = \begin{bmatrix} 0.005455 & 0.99863 & 0.052049 & -139.965688 \\ 0.999841 & -0.004564 & -0.01722 & -156.60905 \\ -0.016959 & 0.052135 & -0.998496 & 676.356868 \\ 0 & 0 & 0 & 1 \end{bmatrix} \tag{10}$$

$$M_{4\times 4} = \begin{bmatrix} -0.998629251133979 & 0.00456409658853422 & -0.0521346581614018 & -76.2979385993388 \\ -0.0520493085132805 & 0.0172201622159464 & 0.99849609247091 & 58.0820111165616 \\ 0.00545490032392567 & 0.999841613086292 & -0.0169588565906983 & -106.982186407299 \\ 0 & 0 & 0 & 1 \end{bmatrix} \tag{11}$$

Figure 10:
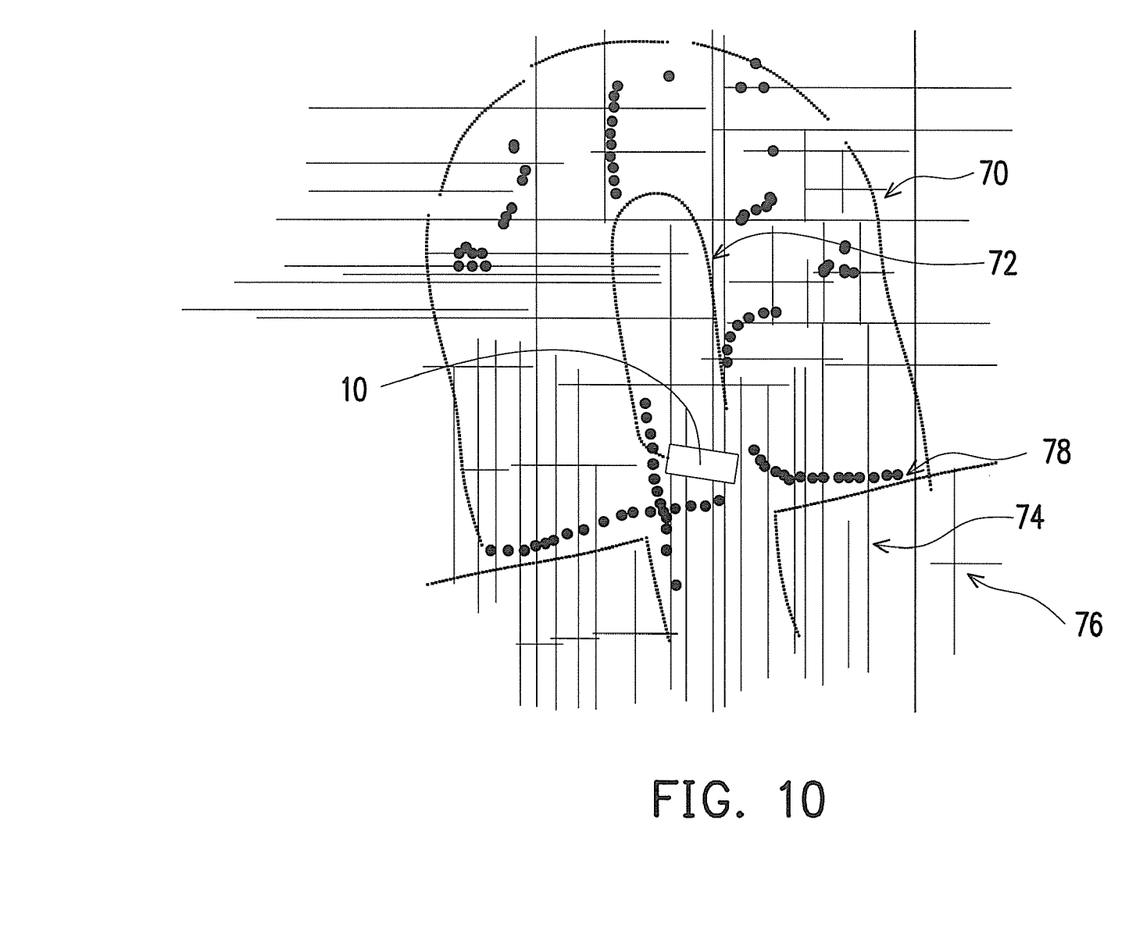
FIG. 10 is a schematic diagram illustrating an experiment of using a method of the present embodiment to localize a movable carrier.

FIG. 10 is a schematic diagram illustrating an experiment of using the method of the present embodiment to localize the movable carrier 10. As shown in FIG. 10, the vertical and horizontal lines represents the partitioned spaces (i.e., the nodes, referring to the descriptions of FIGS. 5A and 5B) of the K-D tree, the reference number 76 represents a node of the K-D tree. Each of the partitioned space has a part of the point data (represented by a referential number 70). The point data 70 represent a result obtained after the positions of all of the scan points obtained by the first laser image-taking device 20 are adjusted according to the weighted ICP method and are merged into the K-D tree structure.

Moreover, a track 72 represents a motion path of the movable carrier 10. Tracks 78 mainly represent motion paths of dynamic objects (such as pedestrians, etc.), which are regarded as unusable reference points due to excessive distance errors, and in the localization process, the tracks 78 are neglected and are not included in the calculation.

According to the experiment, the track of the movable carrier 10 can be obtained through to a self-localization process, and a timestamp corresponding to each track can be recorded.

Figure 11:
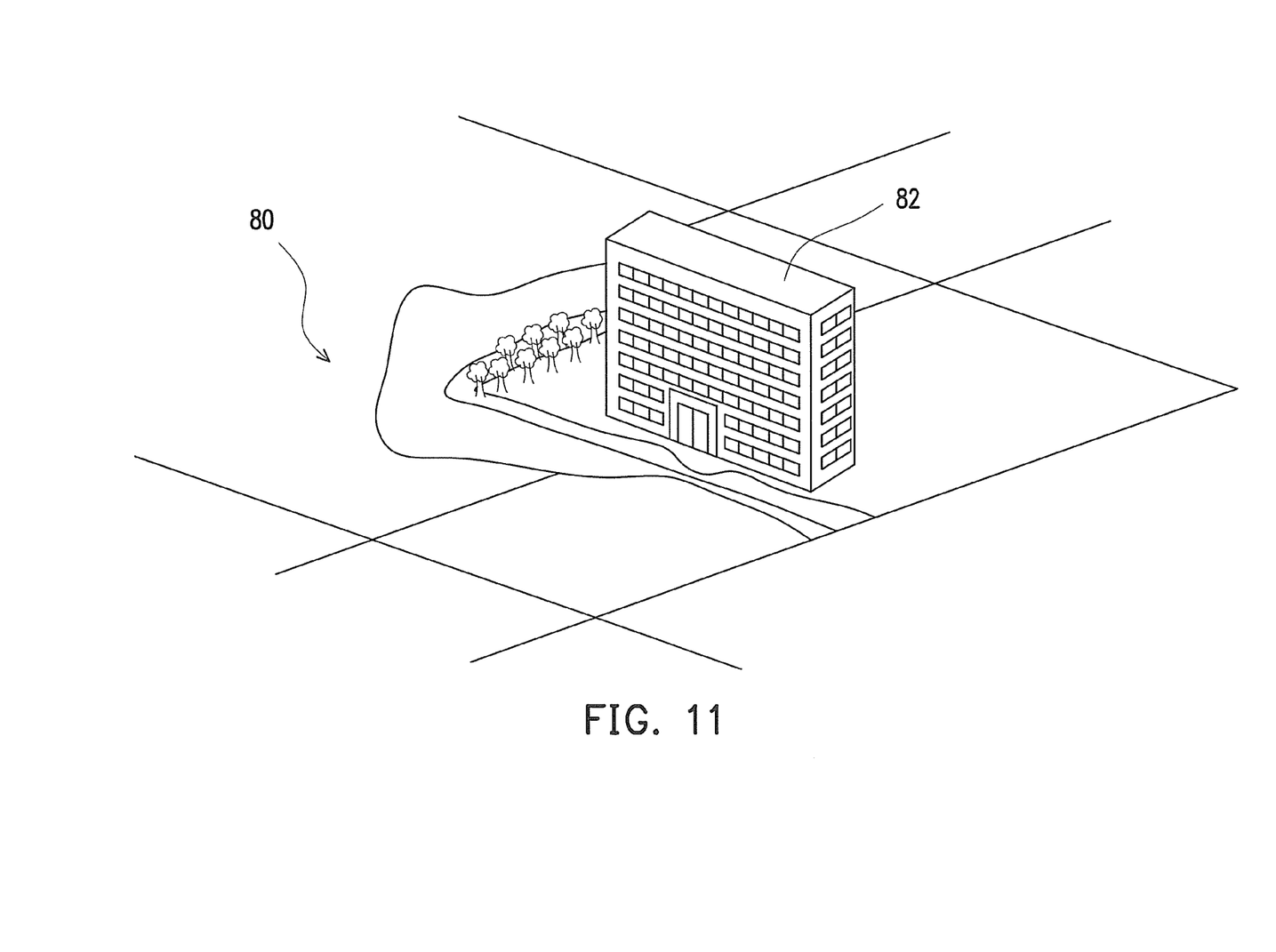
FIG. 11 is a schematic diagram illustrating an experiment of restoring a 3D map of the present embodiment.

FIG. 10 is a map constructed according to the K-D tree method, and once the location of the point data contained in each of the partitioned region is completed, the coordinates of the second laser image-taking device 30 (LiDAR) can be calculated according to the synchronization or interpolation technique, and an experiment result thereof is shown in FIG. 11. According to FIG. 11, 80 represents the 2D map constructed via localization, 82 represents the point data generated when the 3D point data obtained by the second laser image-taking device (LiDAR) is restored in the space. The same method can also be applied to the color CCD device 40 for determining space positions of images, so as to achieve image localization, by which a relative relationship between a series of images and a map, and the 3D points can be recorded.

Therefore, based on the self-localization of the movable carrier 10 moved on a plane, not only the other laser image-taking devices (LiDAR) can be localized, the image-taking other image-taking devices (if necessary). Moreover, by using a second laser device used for localization, the 3D map can be further established.

Moreover, regarding the software, the point data can be continually received from the laser image-taking device (LiDAR). The K-D tree structure is established according to the first lot point data of the LiDAR. Then, the current position is continually compared to the relative position in the K-D tree structure (for estimating the current position of the movable carrier). Then, the point data of the branches of the quad tree structure are continually merged (combined, expended and updated) to establish the 2D map. Moreover, the corresponding position of the other sensors on the movable carrier can be calculated according to the synchronization or the interpolation technique, so as to establish a 3D map.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A self-localization device, comprising:
   a movable carrier, for performing a movement and a rotation on a plane, wherein the movement and the rotation are independent;
   a laser image-taking device, disposed on the movable carrier, for acquiring an i-th lot point data in a space at a time point $t_i$ when the movable carrier moves, where i is an index number from 1 to n, and n is an integer; and
   a processor, controlling the laser image-taking device, and receiving coordinates of the i-th lot point data (i∈[1,n]), wherein the processor executes a K-D tree algorithm to perform a comparison and merge process to a first and the i-th lots point data, so as to establish a two dimensional (2D) profile, and
   the K-D tree algorithm refers to that the i-th lot point data (i∈[1,n]) obtained by the laser image-taking device is processed by the processor to generate a K-D tree structure, and a data comparison, a data merge or a carrier position update is performed between the K-D tree structure and the i-th lot point data obtained through a current scan.

2. The self-localization device as claimed in claim 1, wherein the comparison and merge process further comprises:
(i) establishing a K-D tree structure according to the first lot point data, wherein the K-D tree structure has a plurality of nodes, and each node consists of a plurality of point data;
(ii) comparing the i-th lot point data with each of the point data of each of the nodes in the K-D tree structure to find a point data closest to the i-th lot point data from each of the nodes to serve as a comparison point;
(iii) merging the i-th lot point data into the K-D tree structure; and
(iv) storing a current position and status of the movable carrier.

3. The self-localization device as claimed in claim 2, wherein the step (iii) further comprises:
distributing each of the i-th lot point data to a corresponding node in the K-D tree structure during merging.

4. The self-localization device as claimed in claim 2, wherein the step (iii) further comprises merging each of the point data according to a weighting function when each of the point data in each of the nodes is closed to a predetermined value.

5. The self-localization device as claimed in claim 2, wherein the step (iii) further comprises:
partitioning the node when a point density of each node of the K-D tree structure exceeds a predetermined value.

6. The self-localization device as claimed in claim 1, wherein the data comparison refers to that a global comparison is performed between the K-D tree structure and the i-th lot point data obtained through the current scan corresponding to a current position of the movable carrier, so as to determine a corresponding point, and a weighted iterative closest point (ICP) operation is performed to minimize a matching error between the i-th lot point data (i∈[1,n]) obtained through the current scan and a map data.

7. The self-localization device as claimed in claim 1, wherein the data merge refers to that the i-th lot point data is distributed one-by-one to a corresponding node in the K-D tree structure, and a weight linear merge is performed between the distributed point data and an adjacent data in the node, and a weight value of the merged point data is updated.

8. The self-localization device as claimed in claim 1, wherein the carrier position update refers to that while the i-th lot point data is merged to the K-D tree structure, a current position, status and time information of the movable carrier are recorded.

9. The self-localization device as claimed in claim 1, wherein the movable carrier comprises a wheel carrier or a non-wheel carrier.

10. The self-localization device as claimed in claim 9, wherein the wheel carrier comprises a single-wheel carrier or a multi-wheel carrier.

11. The self-localization device as claimed in claim 1, wherein the movable carrier comprises a device powered by fuel, electricity or a human-power.

12. The self-localization device as claimed in claim 9, wherein the non-wheel carrier comprises a track device, a ball-type device, a rail-type device or a magnetic levitation device.

13. A method for self-localization, comprising:
using a first laser image-taking device to acquire an i-th lot point data in a space at a time point $t_i$ during a motion of a movable carrier, where i is an index number from 1 to n, and n is an integer;
using a processor to execute a K-D tree algorithm to perform a comparison and merge process to a first lot point data and the i-th lot point data obtained by the first laser image-taking device, so as to establish a 2D profile,
wherein the K-D tree algorithm refers to that the i-th lot point data (i∈[1,n]) obtained by the first laser image-taking device is processed by the processor to generate a K-D tree structure, and a data comparison, a data merge or a carrier position update is performed between the K-D tree structure and the i-th lot point data obtained through a current scan.

14. The method for self-localization as claimed in claim 13, wherein the comparison and merge process further comprises:
(i) establishing a K-D tree structure according to the first lot point data, wherein the K-D tree structure has a plurality of nodes, and each node consists of a plurality of point data;
(ii) comparing the i-th lot point data to each of the point data of each of the nodes in the K-D tree structure to find a point data closest to the i-th lot point data from each of the nodes to serve as a comparison point;
(iii) merging the i-th lot point data into the K-D tree structure; and
(iv) storing a current position and status of the movable carrier.

15. The method for self-localization as claimed in claim 14, wherein the step (iii) further comprises:
distributing each of the i-th lot point data to a corresponding node in the K-D tree structure during merging.

16. The method for self-localization as claimed in claim 15, wherein the step (iii) further comprises merging each of the point data according to a weight value when each of the point data in each of the nodes is closed to a predetermined value.

17. The method for self-localization as claimed in claim 14, wherein the step (iii) further comprises:
partitioning a node when a point density of the node of the K-D tree structure exceeds a predetermined value.

18. The method for self-localization as claimed in claim 13, wherein the data comparison refers to that a global comparison is performed between the K-D tree structure and the i-th lot point data obtained through the current scan corresponding to a current position of the movable carrier, so as to determine a corresponding point, and a weighted iterative closest point (ICP) operation is performed to minimize a matching error between the i-th lot point data (i∈[1,n]) obtained through the current scan and a map data.

19. The method for self-localization as claimed in claim 13, wherein the data merge refers to that the i-th lot point data is one-by-one distributed to a corresponding node in the K-D tree structure, and a weight linear merge is performed between the distributed point data and an adjacent data in the node, and a weight value of the merged point data is updated.

20. The method for self-localization as claimed in claim 13, wherein the carrier position update refers to that while the i-th lot point data is merged to the K-D tree structure, a current position, status and time information of the movable carrier are recorded.

* * * * *